United States Patent [19]

Fisher et al.

[11] Patent Number: 4,718,136
[45] Date of Patent: Jan. 12, 1988

[54] DOCKBOARDS

[76] Inventors: Patrick W. Fisher, 7830 N. 53rd St., Milwaukee, Wis. 53223; James P. Hagen, W322 N6811 Wildwood Point Rd., Hartland, Wis. 53029; Walter E. Meyer, 3359 Highway I, Saukville, Wis. 53090

[21] Appl. No.: 889,803

[22] Filed: Jul. 23, 1986

[51] Int. Cl.⁴ .................................................. E01D 1/00
[52] U.S. Cl. .................................... 14/71.3; 14/71.7
[58] Field of Search ..................... 14/71.1, 71.3, 71.7

[56] References Cited

U.S. PATENT DOCUMENTS

| 2,644,971 | 7/1953 | Rowe | 14/7.17 |
|---|---|---|---|
| 3,203,002 | 8/1965 | McGuire | 14/71.3 |
| 3,204,270 | 9/1965 | Fenton | 14/71.7 |
| 3,249,956 | 5/1966 | Zajac et al. | 14/71.3 |
| 3,587,126 | 6/1971 | Potter | 14/71.3 |
| 3,886,615 | 6/1975 | Metro | 14/71.3 |
| 4,557,008 | 12/1985 | Jurden | 14/71.1 X |

FOREIGN PATENT DOCUMENTS

| 2852888 | 8/1980 | Fed. Rep. of Germany | 14/71.1 |
|---|---|---|---|
| 2004555 | 11/1969 | France | 14/71.3 |
| 2094751 | 9/1982 | United Kingdom | 14/71.7 |

Primary Examiner—Stephen J. Novosad
Assistant Examiner—John F. Letchford
Attorney, Agent, or Firm—Ronald E. Barry

[57] ABSTRACT

A dockboard comprising a ramp assembly, a frame for supporting the ramp assembly for pivotal movement in a pit formed in a loading dock, a hydraulic piston-cylinder assembly mounted on the bottom of the pit in the loading dock for pivoting the ramp assembly with respect to the supporting means, a lip assembly pivotally mounted on the free end of the ramp assembly, a hydraulic piston-cylinder assembly mounted on the ramp assembly for pivoting the lip assembly to an extended position forming a continuation of said ramp assembly, the ramp assembly including a tread plate and a plurality of hinge plates mounted in a parallel spaced relation on the tread plate, each hinge plate including an ear, and a stop bar mounted on the end of the ramp assembly in the path of travel of the ears for limiting the pivotal movement of the lip assembly.

4 Claims, 8 Drawing Figures

DOCKBOARDS

BACKGROUND OF THE INVENTION

A variety of types of dockboards are available for loading and unloading equipment from vehicles parked in a loading dock. Many of these dockboards are provided with relatively complex power-operated elevating systems and power and manual-operated systems for raising and lowering the hinged lip. These dockboards have been used successfully for many years. However, they are relatively costly and require considerable maintenance further increasing the overall cost.

SUMMARY OF THE INVENTION

A dockboard of the present invention is designed for simplicity both in operation and in installation in a loading dock. The dockboard is supported in the loading dock soley by a pivot support located at the back of the pit in the loading dock and a lip rest at front of the pit in the loading dock. This frameless support system allows the dockboard to be housed in a smaller pit than required for present dockboards. A simple two stage elevating system is used to raise the dockboard above and lower the dockboard below the level of the loading dock. This type of elevating system also allows the dockboard to service trucks which are higher and lower than those serviced by present dockboards. The lip assembly on the end of the dockboard is provided with a unique stress-relief arrangement to reduce the moment forces imposed on the hinge pin for the lip assembly when the lip engages the edge of the ramp assembly.

IN THE DRAWINGS

DESCRIPTION OF THE INVENTION

Figures 1, 2:
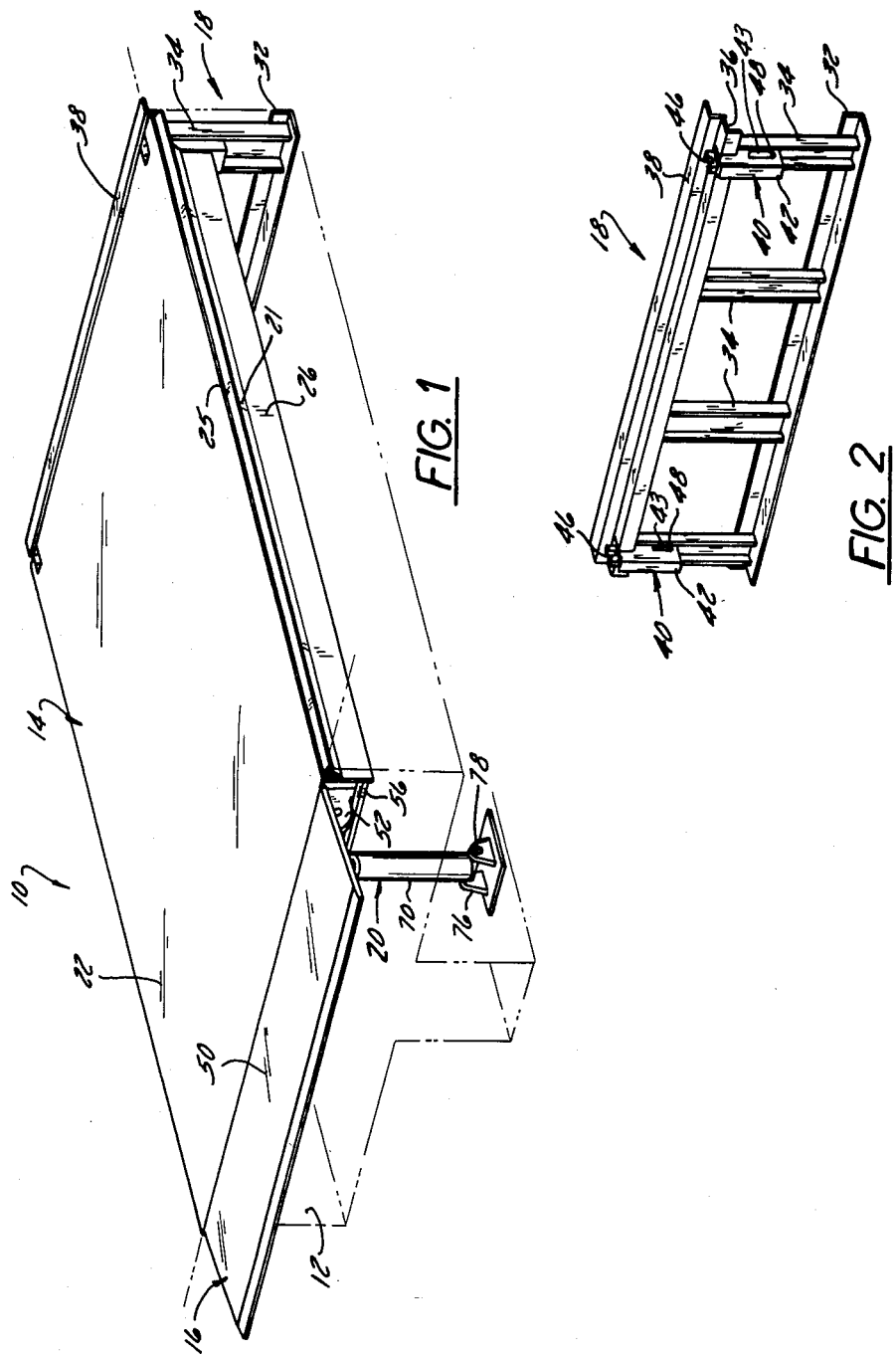
FIG. 1 is a perspective view of the dockboard shown in the storage position with the lip assembly extended.
FIG. 2 is a perspective view of the support assembly for the dockboard.
Figure 5:
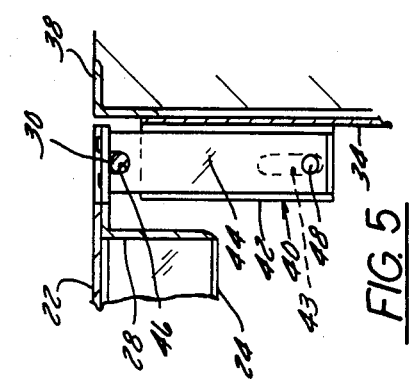
FIG. 5 is a section view of the hinge support frame for the ramp assembly.

The dockboard 10 according to the present invention is designed to be mounted in a recess or pit 12 formed in the front of a loading dock. The dockboard generally includes a ramp assembly 14 having a lip assembly 16 pivotally mounted on the front of the ramp assembly, a ramp support frame 18, a lip rest 19 and a lift mechanism 20. The dockboard 10 is normally stored in a cross-travel position even with the top of the loading dock. In this position, the lip assembly 16 depends from the end of the ramp assembly 14 and is seated on the lip rest 19.

In operation, the ramp assembly 14 is pivoted upwardly with respect to the ramp support assembly 18 on actuation of the lift mechanism 20. The lip assembly 16 is initially lifted off of the lip rest 19 and extended when the ramp assembly 14 is at the upper position. The ramp assembly 14 is lowered onto the bed of a truck or trailer until the front edge of the lip assembly 16 rests on the bed of the truck.

The ramp assembly 14 includes a deck 22 supported by a number of I-beams 24 mounted in a parallel spaced relation on the bottom of the deck 22. The sides of the ramp assembly are enclosed by side plates 26 which are secured to the deck 22 and spaced inwardly a short distance from the edge. The rear of the ramp assembly is provided with an angle iron 28 to support a pivot rod 30.

Means are provided along the edges of the ramp assembly for producing a weather seal with the loading dock. Such means is in the form of a strip of flexible material 25 such as rubber which is folded to form a bead 27. The bead 27 is clamped in a slot 29 formed by an angle plate 21 secured to the sidewall 26. The edges of the strip 25 project outwardly through the space between the deck 22 and plate 21. The width of the strip projecting from the edge of the deck can be adjusted to fill the gap between the deck and the loading dock. This is accomplished by rolling the bead 27 so that one edge of the strip projects outward farther than the other edge of the strip.

The support frame 18 includes a bottom angle iron 32, a number of vertical channel members 34 secured to the angle iron 32, and an upper angle iron 36 secured to the top of the channel members 34. A rear angle iron 38 is provided along the back of the upper angle iron 36 at the top of the channel members 34 to matingly engage the front edge of the dock. The frame 18 is located on the back wall of the pit and is the only frame necessary to support the ramp assembly. The ramp assembly 14 is supported on the support assembly 18 by means of a pair of pivot blocks 40 provided on the support assembly.

In this regard, each of the pivot blocks 40 includes a housing 42 having a slot 43 on each side. A slide block 44 is removably mounted in the housings 42. Each slide block 44 includes a groove 46 at the upper end. The slide block 44 is retained in the housing by means of a pin 48 which is aligned with slots 43. It should be noted that the block 44 is free to move upward in the housing within the limits of slots 43.

It should be noted that the pit 12 can be made considerably smaller by sloping the bottom of the pit from the back wall toward the front wall. The depth of the pit 12 at the back wall should be sufficient to accommodate the pivot blocks 40 and at the front wall the depth should equal the length of the lip plate 50. It should be understood that the two stage lift mechanism 20 will be mounted in a separate pit having a depth sufficient for the ramp assembly to clear the cylinder 20.

The lip assembly 16 includes a lip or tread plate 50 and a plurality of hinge plates or lugs 52 mounted on the bottom of the plate 50 in a parallel spaced relation. Each of the lugs 52 is in the form of a circular plate having a central opening 53. Means in the form of stop members or ears 54 are formed as an integral part of each of the lugs 52 which extend outwardly therefrom. The lugs 52 are mounted on the plate 50 with the ears 54 located in a parallel relation to the ears 54 on the adjacent lugs.

Means are provided on the ends of the I-beams 24 on the ramp assembly to reduce the moment forces imposed on the lip assembly when resting on the bed of a truck. Such means is in the form of a stop bar 56 located in the path of motion of the ears 54 on the lugs 52 in order to limit the travel of the lip assembly as described hereinafter.

The lip assembly 16 is supported on the front of the ramp assembly by means of pins 64 provided in tubular members 60. In this regard, it should be noted that the tubular members 60 are mounted on plates 62 which are secured to the ends of the I-beams 24. The lip assembly 16 is mounted on the ramp assembly 14 by inserting the lugs 52 into the spaces between the tubular members 60. The pivot pins 64 are inserted through the lug openings 53 and the tubular members 60 to provide the pivot support.

Figure 4:
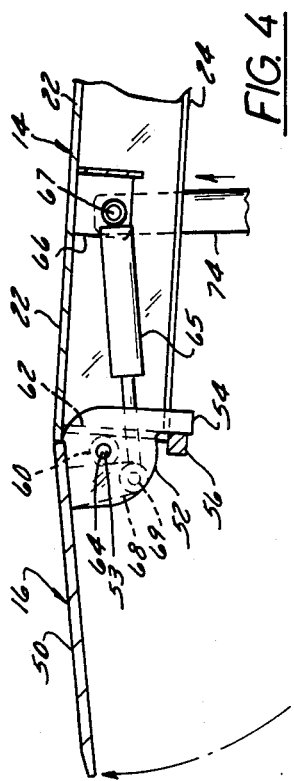
FIG. 4 is a section view of a portion of the dockboard showing the lip assembly in the elevated position.
Figure 3:
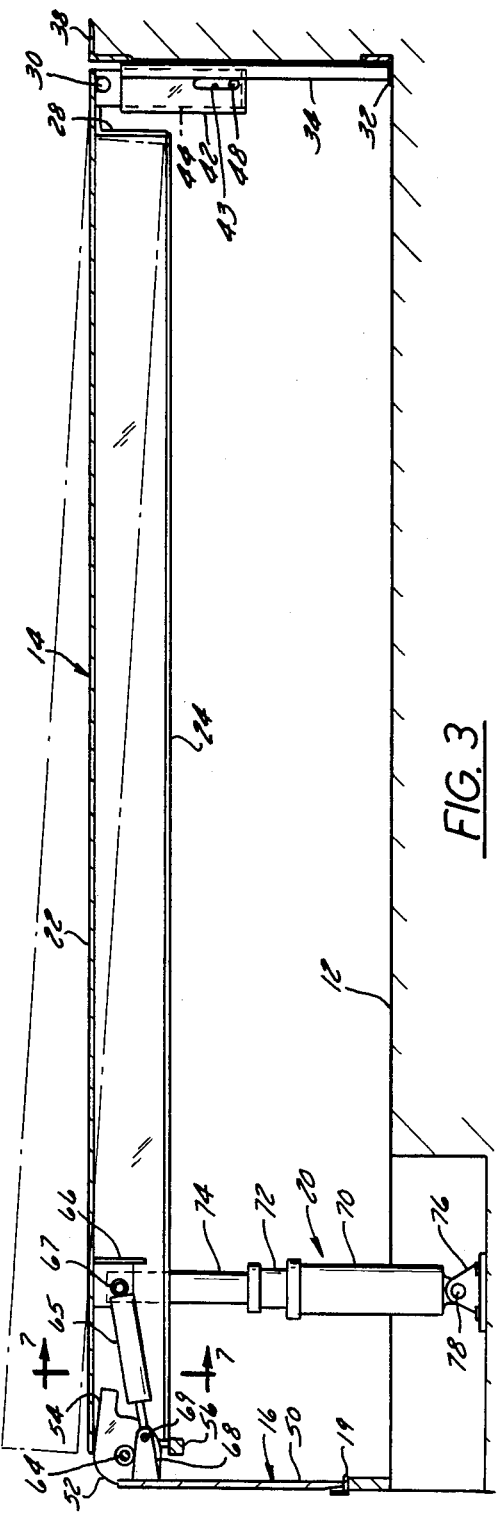
FIG. 3 is a side elevation view of the dockboard shown in the storage position.
Figure 7:
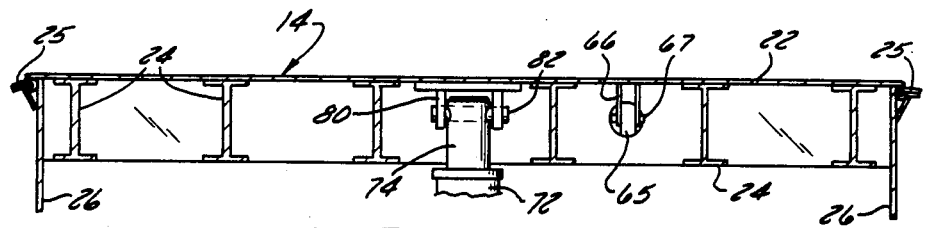
FIG 7 is a view taken on line 7—7 of FIG. 3, showing a across section of the dockboard.
Figure 8:
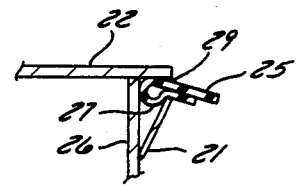
FIG. 8 is an enlarged view of a portion of the edge of the dockboard showing the weather seal for the edge of the board.
Figure 6:
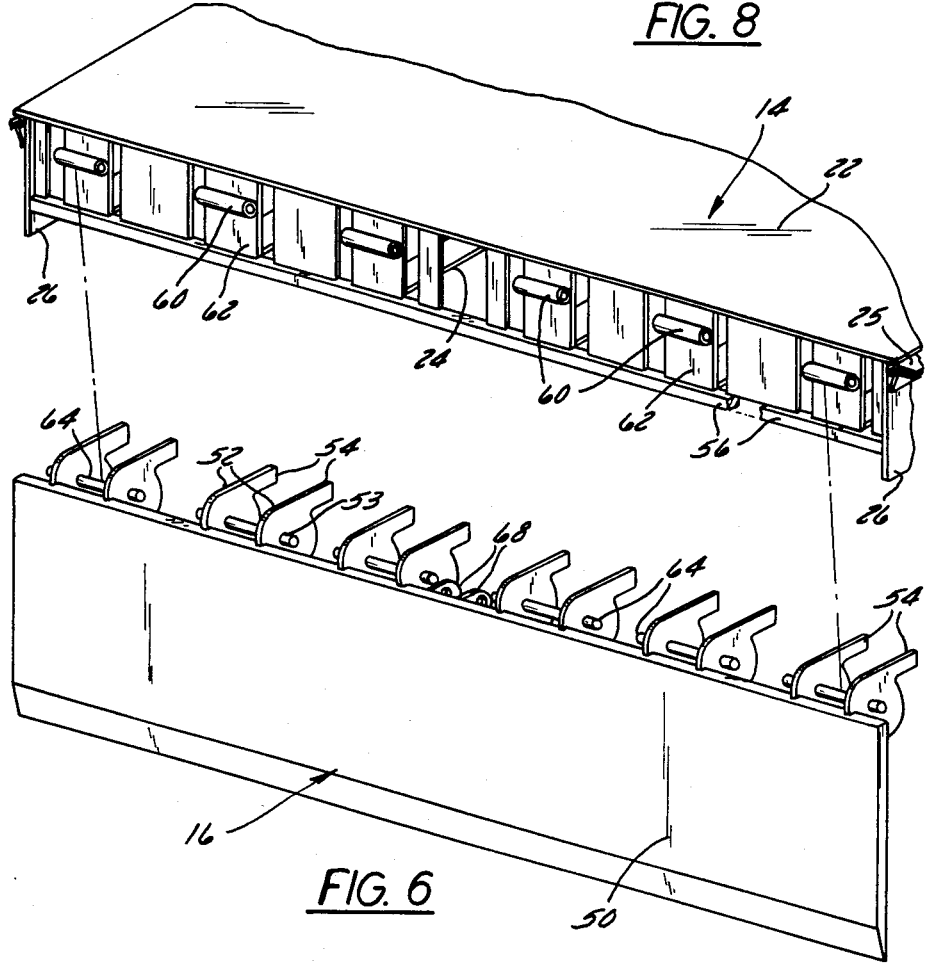
FIG. 6 is an exploded perspective view of the hinged lip assembly.

The lip assembly 16 is raised and lowered by means of a double acting hydraulic piston-cylinder assembly 65 which is pivotally connected to a bracket 66 on the bottom of the deck plate 22 by means of a pin 67 and to a pair of plates 68 provided on the bottom of the lip plate 50 by means of a pin 69. Referring to FIG. 4, it should be noted that on actuation of the piston-cylinder assembly 65, the lip assembly will pivot around the pins 64 until the edge of the lip 50 engages the edge of the deck 22 on the ramp assembly 14. At the same time, the ears 54 on the lip lugs 52 will engage the lip stop bar 56. When the ramp assembly 14 is lowered to bring the lip plate 50 into engagement with the bed of a vehicle, the moment force applied to the front edge of the plate 50 was previously taken up by the engagement of the rear edge of lip 50 with the edge of deck 22 and the hinge pin 64.

In this regard it should be noted that in the present invention the force previously imposed on the hinge pin 64 is now taken up by the engagement of the ears 54 with the stop bar 56. It should also be noted that the moment arm between the edge of deck 22 and the stop bar 56 is approximately three times as long as the moment arm from the edge of deck 22 and the pin 64. The actual force imposed on the ear 54 is therefore reduced by a factor of three while the force on the hinge pin 64 is reduced to zero.

The ramp assembly 14 is pivoted on the loading dock by means of the lift mechanism 20. In this regard, the mechanism 20 is in the form of a two stage hydraulic piston-cylinder assembly. The assembly includes a cylinder 70, a first piston 72, and a second piston 74 mounted in the first piston 72. The cylinder 70 is pivotally connected to the loading dock by means of a bracket 76 secured to the bottom of the pit and a pin 78. The piston 74 is pivotally connected to the ramp assembly by means of a bracket 80 provided on the bottom of the ramp assembly 14 and a pin 82. It should be noted that the brackets 76, 80 are axially aligned in a vertical relation when the ramp assembly is in the storage position. With this arrangement, the force of the hydraulic piston-cylinder assembly 20 is initially applied in a substantially perpendicular relation to the ramp assembly. Locating the piston cylinder assembly in a position to act directly on the ramp assembly makes it possible to apply the full force of the piston cylinder assembly to the ramp assembly and thus operate at lower pressures. The double piston also allows the ramp assembly to be moved both above and below the loading dock without any additional space requirement for the lift mechanism.

The embodiments of the invention in which an exclusive property or privilege is claimed, are defined as follows:

1. A dockboard comprising a ramp assembly, means for supporting said ramp assembly for pivotal movement in a pit formed in a loading dock, means mounted on the bottom of the pit in the loading dock for pivoting said ramp assembly with respect to said supporting means, a lip assembly pivotally mounted on the free end of the ramp assembly, said lip assembly includes a tread plate and a plurality of pivot plates mounted in a parallel spaced relation on said tread plate, means mounted on said ramp assembly for pivoting the lip assembly to an extended position forming a continuation of said ramp assembly, and means for limiting the pivotal movement of said lip assembly, said limiting means comprising a tab formed as an integral part of each pivot plate and a stop bar mounted on said ramp assembly in the path of motion of said tabs whereby a moment force imposed on the tread plate is transferred to said stop bar.

2. The dockboard according to claim 1 wherein said ramp pivoting means comprises a two stage piston-cylinder assembly pivotally mounted on the bottom of the pit and operatively connected to the ramp assembly in a vertical relation whereby the full force of the piston cylinder assembly is directed to the ramp assembly.

3. The dockboard according to claim 1 including means mounted on the sides of the ramp assembly for sealing the space between the ramp assembly and the loading dock from the weather, said sealing means including a strip of flexible material folded in half and means on the sides of the ramp assembly for clamping the folded edge of the strip onto the sides of said ramp assembly whereby said strip can be adjusted to accomodate a gap greater than half the strip width.

4. A dockboard for a loading dock having a pit formed in the dock, said dockboard comprising a ramp assembly, a support frame mounted in the back of the pit for pivotally supporting said ramp assembly on the loading dock, a lift mechanism pivotally mounted in the pit and operatively connected to pivot said ramp assembly both above and below the top of said loading dock including a two stage hydraulic piston-cylinder assembly including a cylinder having one end pivotally connected to the bottom of the pit in the loading dock and a first piston pivotally connected to said ramp assembly, the pivotal connection of said cylinder to the bottom of the pit in the loading dock being located in vertical axial alignment with the pivotal connection of the piston to said ramp assembly, a lip assembly, means pivotally mounting said lip assembly on one end of said ramp assembly, means for pivoting said lip assembly to an extended position with respect to the ramp assembly, said lip assembly including a number of pivot plates mounted on the lip assembly in a parallel spaced relation, each of said pivot plates including an ear, and a cross bar mounted on said ramp assembly in the point of motion of said ears for limiting the pivotal motion of the lip assembly to reduce the force imposed on the pivot means when the lip assembly engages the end of the ramp assembly.

* * * * *